United States Patent
Richardson

(10) Patent No.: US 8,120,700 B2
(45) Date of Patent: Feb. 21, 2012

(54) IMAGE SENSOR POWER SUPPLY

(75) Inventor: Justin Richardson, Edinburgh (GB)

(73) Assignee: STMicroelectronics (Research & Development) Limited, Marlow-Buckinghamshire (GB)

( * ) Notice: Subject to any disclaimer, the term of this patent is extended or adjusted under 35 U.S.C. 154(b) by 930 days.

(21) Appl. No.: 11/972,938

(22) Filed: Jan. 11, 2008

(65) Prior Publication Data

US 2008/0170145 A1    Jul. 17, 2008

(30) Foreign Application Priority Data

Jan. 12, 2007   (EP) .................................... 07270005

(51) Int. Cl.
*H04N 5/225*   (2006.01)
*H04N 3/14*    (2006.01)

(52) U.S. Cl. ....................... 348/372; 348/294

(58) Field of Classification Search .............. 348/294, 348/372

See application file for complete search history.

(56) References Cited

U.S. PATENT DOCUMENTS

| 7,119,606 B2 * | 10/2006 | Fahim ........................... 327/541 |
| 7,365,792 B2 * | 4/2008 | Watanabe et al. ............. 348/372 |
| 7,701,497 B2 * | 4/2010 | Fraenkel et al. ............. 348/294 |

FOREIGN PATENT DOCUMENTS

| EP | 0789346 | 8/1997 |
| EP | 1605685 | 12/2005 |
| GB | 2401274 | 11/2004 |
| GB | 2401274 A * | 11/2004 |
| JP | 09288309 | 4/1997 |

\* cited by examiner

*Primary Examiner* — Ngoc-Yen Vu

(74) *Attorney, Agent, or Firm* — Allen, Dyer, Doppelt, Milbrath & Gilchrist, P.A.

(57) ABSTRACT

An image sensor may have a power supply voltage regulator controlled by a feedback loop. The feedback signal may be derived by applying the supply voltage at a point distant from the voltage regulator to an analog-to-digital converter (ADC) which may be a spare channel of an ADC provided for the output of the pixel array. The digital feedback loop may be controlled via a chip $I^2C$ bus.

25 Claims, 1 Drawing Sheet

IMAGE SENSOR POWER SUPPLY

FIELD OF THE INVENTION

This invention relates to the control of power supply within integrated circuits, and, in particular, to solid state image sensor circuits.

BACKGROUND OF THE INVENTION

In CMOS image sensors, it is common to supply power to the pixel array from an on-chip voltage regulator. The analog-to-digital converter in each pixel typically requires a certain minimum voltage, typically 1.2V, to operate correctly. However, the IR voltage drop varies with the distance of a given pixel from the supply point, and this becomes exacerbated as the array size increases. One approach is to control the voltage regulator by an analog feedback loop from the farthest pixel, but such a feedback loop can have stability problems owing to the parasitics (resistance, capacitance, and some inductance) of the long remote sensing route.

A further problem in known arrangements is that, in order to deal with high frequency load variations, it may be necessary for the voltage regulator to have an external compensation component in the form of a relatively large capacitance. This may be provided by a capacitor external to the chip, and thus may require extra parts and assembly and connection operations.

SUMMARY OF THE INVENTION

According to the present invention a solid state image sensor may comprise a pixel array, a voltage regulator which in use supplies a regulated voltage to the device digital core, and means for controlling or a controller for the voltage regulator. The controller may comprise an analog-to-digital converter (ADC) at a location spaced from the voltage regulator, with the ADC being arranged to receive the regulated voltage at the location and to supply a digital representation of the received voltage to the voltage regulator.

Preferably the location is adjacent that part of the sensor which is farthest from the voltage regulator. Preferably also, the ADC forms part of an output ADC of the pixel array.

Logic means or a logic circuit may be connected to receive the digital representation and to apply control signals to the voltage regulator. This allows the nature of the feedback to be readily controlled, preferably by the logic means control signals simulating a leaky integrator control loop, which may effect both correction for IR voltage drop and load regulation.

Since the feedback is in digital form it may be used in the I²C environment which will typically be present in an image sensor chip, and accordingly the logic means may be connected to an I²C bus. Preferably, the digital control loop can be enabled and disabled via the I²C bus.

In preferred embodiments an additional feedback loop may be provided to correct peak high-frequency load variations. The additional feedback loop may suitably be an analog feedback loop within the voltage regulator.

The pixel array and the voltage regulator may advantageously form part of a single integrated circuit chip without the voltage regulator using any external capacitor.

Another aspect is a method of controlling a supply voltage supplied by a voltage regulator to a solid state image sensor. The method may comprise sensing the supply voltage at a location of the solid state image sensor remote from the voltage regulator, converting the sensed voltage to a digital value, and transmitting the digital value to the voltage regulator for use as a control input.

Preferably, the sensing is carried out adjacent that part of the sensor which is farthest from the voltage regulator. Preferably also, the digital value is fed to a logic means or logic circuit which controls the voltage regulator, and which may suitably simulate a leaky integrator control loop. The control loop advantageously effects both correction for IR voltage drop and load regulation.

The logic means is preferably controllable via an I²C bus. An additional feedback signal, preferably an analog feedback signal within the voltage regulator, may be provided to the voltage regulator to correct peak high-frequency load variations.

Another embodiment further provides a camera, mobile phone or computer pointing device incorporating the solid state image sensor defined above.

BRIEF DESCRIPTION OF THE DRAWINGS

An embodiment of the invention will now be described, by way of example only, with reference to the drawings, in which.

DETAILED DESCRIPTION OF THE PREFERRED EMBODIMENTS

Figure 1:
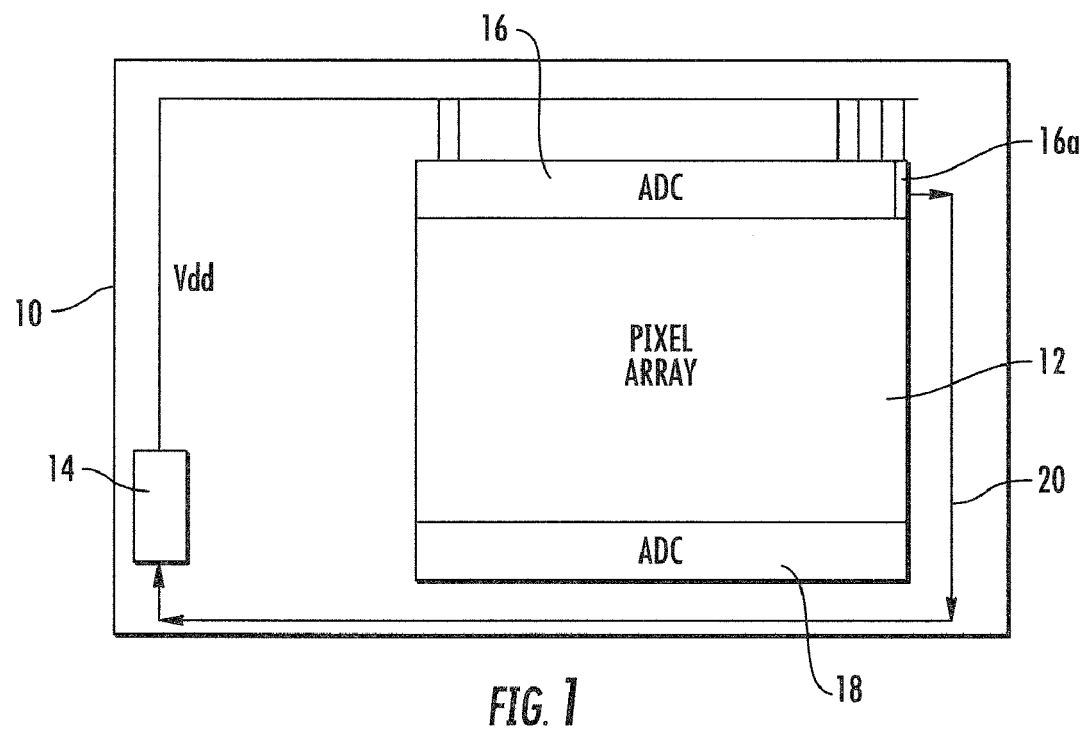
FIG. 1 is a schematic view of an image sensor illustrating the invention.

Referring to FIG. 1, an image sensor chip, for example, a CMOS image sensor, has a front face 10 which includes a pixel array 12. Also formed in the chip is a voltage regulator 14, and a pair of analog-to-digital converters (ADCs) 16 and 18. In this embodiment the ADCs 16, 18 are provided at the top and bottom of the pixel array 12 for converting pixel readout signals to digital form, as is well known in the art; however, the invention may also be applied to image sensors having other ADC arrangements, such as a single ADC at top or bottom of the array.

The voltage regulator 14 provides a supply voltage Vdd to the pixel columns and to other parts of the circuit as desired. Vdd will typically be of the order of 1.2V. Where the pixel array 12 is large in area, and given the low value of Vdd, the voltage drop caused by resistive or IR losses can become sufficiently significant to affect proper pixel function. The voltage drop is of course greatest at the point where the voltage supply path is longest, typically at the most distant corner of the chip.

In the present embodiment, the supply voltage at that point is applied to a spare channel 16a of the ADC 16 to give as an output 20 a digital word representing the actual supply voltage at that point. The ADC 16 will typically have more channels than there are columns of pixels and thus a spare channel will be available. However, if this is not the case then a column of pixels could be disabled to provide ADC capacity without significant loss of picture. The digital word output 20 is fed back to the voltage regulator 14 as a control signal.

Since the feedback 18 is provided in digital form it is possible to digitally process the feedback signal, and also to make use of I²C (inter-integrated circuit communications) facilities which are customarily present in the image sensor chip.

Figure 2:
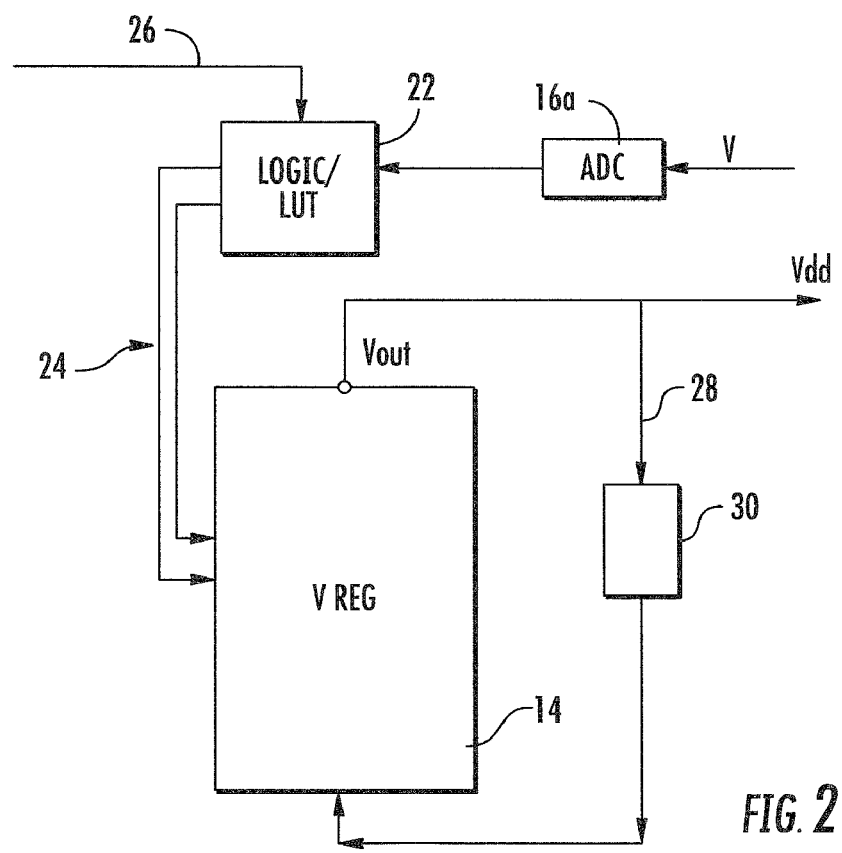
FIG. 2 shows one example of an embodiment of the image sensor in FIG. 1.

Referring now to FIG. 2, the control of the voltage regulator 14 will be described in more detail.

The digital signal 20 is applied to a logic circuit 22 which provides a two-bit control signal 24 to the voltage regulator 14. The logic circuit 22 operates to modify the feedback signal to give a desired transfer function to the feedback signal. A preferred form is to cause the feedback to simulate a leaky integrator control loop with an idealized damping response in order to effect both correction for IR voltage drop and load regulation; both of these are likely to vary with load. The necessary signal processing can conveniently be performed using a look-up table stored in the logic circuit 22.

The logic circuit 22 is also connected to the $I^2C$ bus, as indicated at 26. This enables the logic circuit 22 to be programmed, for example to establish the desired transfer characteristic. It also has the advantage of allowing other operations. For example, the core voltage Vdd can be raised via a single $I^2C$ write to a higher level during module testing for programming non-volatile memory, thus providing a cheaper, simpler and faster test operation. As another example, the digital control loop can be enabled and disabled via $I^2C$ to give an open loop option.

In a preferred form, the ADC 16 a will provide an output at the same time as the image is read out, i.e. once per frame. This allows the digital control loop to correct for IR drop (DC variation) and for average low frequency load variations. High frequency load variations may also occur, and it is therefore preferred that the voltage regulator 22 includes an analog feedback path local to the regulator. This is indicated at 28, and the analog feedback path 28 may include appropriate resistive, capacitive or inductive components as indicated generally at 30.

Controlling the voltage supply on the basis of the most distant point, makes it possible to reduce or minimize dissipation in the voltage regulator. This is significant in the case where the image sensor chip is interfaced with a 1.8V supply but the pixels operate at 1.2V, but in all cases a reduction in total power consumed can be achieved. Thus, the present invention is of particular utility in applications where increasing battery life is desirable, such as mobile phones, cameras and other mobile applications, and in cordless computer accessories such as pointing devices.

That which is claimed:

1. A solid state image sensor comprising:
   a pixel array;
   a voltage regulator coupled to said pixel array to supply a regulated voltage thereto; and
   a controller comprising an analog-to-digital converter positioned at a location spaced apart from said voltage regulator and being arranged to receive the regulated voltage and supply a digital representation of the received regulated voltage to said voltage regulator.

2. The solid state image sensor according to claim 1, in which the location of said analog-to-digital converter is farthest from said voltage regulator.

3. The solid state image sensor according to claim 1, wherein said analog-to-digital converter is coupled to said pixel array to generate an output thereof.

4. The solid state image sensor according to claim 1, further comprising a logic circuit coupled to receive the digital representation and apply control signals to said voltage regulator.

5. The solid state image sensor according to claim 4, in which said logic circuit control signals simulate a leaky integrator control loop.

6. The solid state image sensor according to claim 5, wherein the control signals are for correcting IR voltage drop and regulating load.

7. The solid state image sensor according to claim 4, further comprising an $I^2C$ bus coupled to said logic circuit.

8. The solid state image sensor according to claim 7, wherein said $I^2C$ bus enables and disables said controller.

9. The solid state image sensor according to claim 4, further comprising a feedback loop coupled to said voltage regulator for correcting peak high-frequency load variations.

10. The solid state image sensor according to claim 9, wherein said feedback loop is an analog feedback loop.

11. The solid state image sensor according to claim 1, wherein said pixel array and said voltage regulator form part of a single integrated circuit chip without said voltage regulator using any external capacitor.

12. An electronic device comprising:
    a housing; and
    a solid state image sensor coupled to said housing and comprising
    a pixel array,
    a voltage regulator coupled to said pixel array to supply a regulated voltage thereto, and
    a controller comprising an analog-to-digital converter positioned in spaced relation to said voltage regulator and being arranged to receive the regulated voltage and supply a digital representation of the received regulated voltage to said voltage regulator.

13. The electronic device according to claim 12, wherein said housing is for at least one of a camera, mobile phone, and computer pointing device.

14. The electronic device according to claim 12, in which the location of said analog-to-digital converter is farthest from said voltage regulator.

15. The electronic device according to claim 12, wherein said analog-to-digital converter is coupled to said pixel array to generate an output thereof.

16. The electronic device according to claim 12, further comprising a logic circuit coupled to receive the digital representation and apply control signals to said voltage regulator.

17. The electronic device according to claim 16, in which said logic circuit control signals simulate a leaky integrator control loop.

18. A method of controlling a supply voltage supplied by a voltage regulator in a solid state image sensor, the method comprising:
    sensing the supply voltage at a location of the solid state image sensor remote from the voltage regulator;
    converting the sensed supply voltage to a digital value; and
    transmitting the digital value to the voltage regulator for use as a control input.

19. The method according to claim 18, wherein sensing the supply voltage is carried out adjacent a part of the sensor which is farthest from the voltage regulator.

20. The method according to claim 18, further comprising feeding the digital value to a logic circuit which controls the voltage regulator.

21. The method according to claim 20, wherein the logic circuit simulates a leaky integrator control loop.

22. The method according to claim 21, wherein the leaky integrator control loop is for correcting IR voltage drop and regulating load.

23. The method according to claim 20, further comprising controlling the logic circuit via an $I^2C$ bus.

24. The method according to claim 18, further comprising providing a feedback signal to the voltage regulator for correcting peak high-frequency load variations.

25. The method according to claim 24, wherein the feedback signal is an analog feedback signal.

* * * * *